United States Patent [19]
Feimer et al.
[11] Patent Number: 4,879,044
[45] Date of Patent: Nov. 7, 1989

[54] HIGHLY AROMATIC ANISOTROPIC POLYUREA/URETHANE MEMBRANES AND THEIR USE FOR THE SEPARATION OF AROMATICS FROM NON AROMATICS

[75] Inventors: Joseph L. Feimer, Bright's Grove; Bernd A. Koenitzer, Sarnia, both of Canada; Robert C. Schucker, Baton Rouge, La.

[73] Assignee: Exxon Research and Engineering Company, Florham Park, N.J.

[21] Appl. No.: 307,108

[22] Filed: Feb. 3, 1989

Related U.S. Application Data

[62] Division of Ser. No. 108,821, Oct. 14, 1987, Pat. No. 4,828,773.

[51] Int. Cl.$^4$ .......... B01D 13/00
[52] U.S. Cl. .......... 210/654; 210/500.37
[58] Field of Search .......... 210/634, 641, 642, 644, 210/649, 650, 651, 653, 654, 195.2, 321.6, 321.64, 321.83, 321.84, 321.82, 321.87, 500.27, 500.37, 500.38, 500.39

[56] References Cited

U.S. PATENT DOCUMENTS 2,970,106 1/1961 Binning et al. .......... 208/347

(List continued on next page.)

FOREIGN PATENT DOCUMENTS 1206294 6/1986 Canada .
17905 10/1980 European Pat. Off. .
150620 9/1981 Fed. Rep. of Germany .
151874 11/1981 Fed. Rep. of Germany .
151952 11/1981 Fed. Rep. of Germany .
3513980 10/1986 Fed. Rep. of Germany .
47-39079 10/1972 Japan .
8087115 5/1983 Japan .
8092418 6/1983 Japan .
9059220 4/1984 Japan .
9059222 4/1984 Japan .
0225622 10/1985 Japan .
1000430 1/1986 Japan .
1101211 5/1986 Japan .
1101212 5/1986 Japan .
1391559 4/1975 United Kingdom .
2115344 9/1983 United Kingdom .

OTHER PUBLICATIONS

"Quantitative DSC Evaluation of Phase Segregation Rate in Linear Segmented Polyurethanes and Polyurethaneureas" Camberlin, et al.; J. Poly Science Polymer Chemistry Ed. vol. 24, 415-423 (1983).

"Phase Segregation Kinetics in Segmented Linear Polyurethanes: Relations between Equilibrium Time and Chain Mobility and between Equilibrium Degree of Segregation and Interaction Parameter" Camberlin et al.,; J. Poly Science; Polymer Physics Ed. vol. 22, 1935-1844 (1984).

"New Linear Polyurethaneureas Based on Polyoxytetramethylene, Aliphatic Diisocyanates, and Aromatic Diamines" Knaub et al., J. Applied Poly Science; vol. 32, 5627-5645 (1986).

*Primary Examiner*—Frank Sever
*Attorney, Agent, or Firm*—Joseph J. Allocca

[57] ABSTRACT

An anisotropic elastomeric membrane preferably made from polyurea/urethane has been prepared. These anisotropic membranes are made from the corresponding polymeric material by preparing the polymeric material in a good solvent containing less than 5 vol % non-solvent, producing a film of the polymer solution on a support with a maximum pore size less than 20 microns, subjecting the film to conditions such that the solvent vapor pressure-time factor is 1000 mm Hg-min. or less, preferably 200 mm Hg-min or less, most preferably approaching 0 mm Hg-min and quenching the membrane film in a non-solvent yielding a three-layered anisotropic membrane. The preferred anisotropic membranes made from the polyurea/urethane copolymer, useful for the separation of aromatics from mixtures thereof with non-aromatics and saturates, in, for example, a naphtha feed stream, are characterized by possessing a urea index of at least about 20% but less than 100%, an aromatic carbon content of at least about 15 mole percent, a functional group density of at least about 10 per 1000 grams of polymer and a C=O/NH ratio of less than about 8.0.

11 Claims, 3 Drawing Sheets

U.S. PATENT DOCUMENTS

| | | | |
|---|---|---|---|
| 3,370,102 | 2/1968 | Carpenter et al. | 260/674 |
| 3,456,037 | 7/1969 | Hoeschile | 260/858 |
| 3,567,810 | 3/1971 | Baker | 264/41 |
| 3,709,774 | 1/1973 | Kimura | 161/159 |
| 3,776,970 | 12/1973 | Strazik et al. | 260/669 |
| 3,876,738 | 4/1975 | Marinaccio et al. | 264/41 |
| 4,036,748 | 7/1977 | Knickel et al. | 210/23 |
| 4,086,209 | 4/1978 | Hara et al. | 260/49 |
| 4,107,151 | 8/1978 | Takahashi et al. | 528/54 |
| 4,115,465 | 9/1978 | Elfert et al. | 260/674 |
| 4,129,559 | 12/1978 | Credali et al. | 528/337 |
| 4,137,113 | 1/1979 | Kanamaru et al. | 210/321.84 |
| 4,230,583 | 10/1980 | Chiolle et al. | 210/490 |
| 4,277,340 | 7/1981 | Kanamaru et al. | 210/321.83 |
| 4,340,479 | 7/1982 | Pall | 210/490 |
| 4,528,004 | 7/1985 | Makino et al. | 55/158 |
| 4,532,316 | 7/1985 | Henn | 528/59 |
| 4,704,130 | 11/1987 | Gilding et al. | 623/66 |
| 4,814,083 | 3/1989 | Ford et al. | 210/500.25 |

THREE-LAYERED ANISOTROPIC POLYUREA-URETHANE MEMBRANE

TYPICAL ASYMMETRIC RO MEMBRANE

THREE-LAYERED POLYUREA-URETHANE ON CELLULOSE FILTER PAPER SUPPORT

HIGHLY AROMATIC ANISOTROPIC POLYUREA/URETHANE MEMBRANES AND THEIR USE FOR THE SEPARATION OF AROMATICS FROM NON AROMATICS

This is a division of application Ser. No. 108,821 filed Oct. 14, 1987, now U.S. Pat. No. 4,828,773.

BRIEF DESCRIPTION OF THE INVENTION

An anisotropic elastomeric membrane preferably one of polyurea/urethane is produced by preparing a casting solution of the polymeric material in a good solvent containing less than 5 vol % non-solvent, depositing a thin film of the casting solution on a support having a maximum pore size of less than 20 microns, exposing the thin film on support to conditions such that the solvent vapor pressure-time factor is 1000 mm Hg-min or less, preferably 200 mm Hg-min or less, most preferably approaching 0 mm Hg-min, and quenching the membrane film in a non-solvent yielding the desired three layer anisotropic membrane.

Anisotropic aromatic polyurea/urethane membranes have been fabricated which are characterized by possessing a urea index defined as the percentage of the total of urea and urethane groups that are urea is at least about 20% but less than 100%, an aromatic carbon content of at least about 15 mole percent, a functional group density of at least about 10 per 1000 grams of polymer and a C=O/NH ratio of less than about 8. The anisotropic aromatic polyurea/urethane membranes are particularly useful for separating aromatics from non aromatics in petroleum refining and chemical process plants, especially for upgrading naphtha streams. Such separations are preferably performed under pervaporation or perstraction conditions.

DESCRIPTION OF THE FIGURE of aromatic polyurea/urethane, including

BACKGROUND OF THE INVENTION

Figure 1:
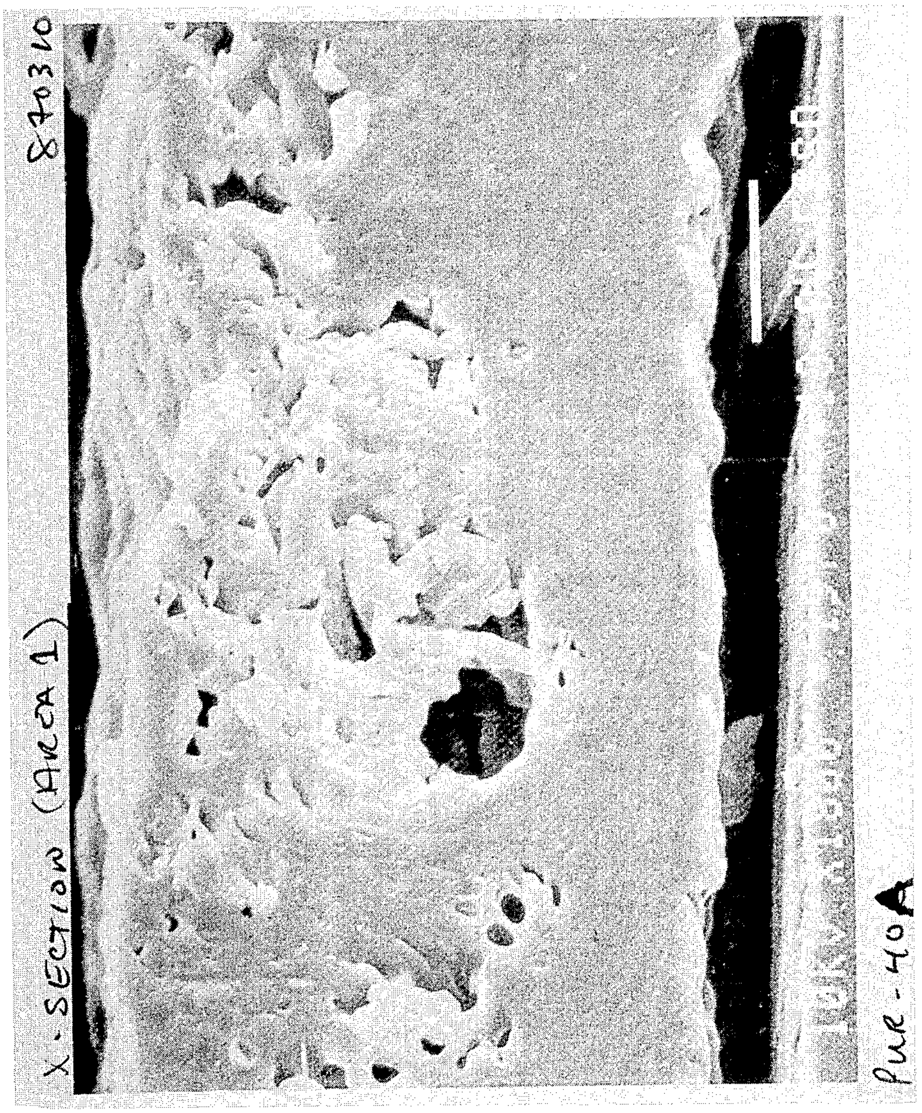
FIG. 1 is a scanning electron microscope (SEM) picture of a three layer polyurea/urethane anisotropic membrane of the present invention.

The use of membranes to separate aromatics from saturates has long been pursued by the scientific and industrial community and is the subject of numerous patents.

U.S. Pat. No. 3,370,102 describes a general process for separating a feed into a permeate stream and a retentate stream and utilizes a sweep liquid to remove the permeate from the face of the membrane to thereby maintain the concentration gradient driving force. The process can be used to separate a wide variety of mixtures including various petroleum fractions, naphthas, oils, hydrocarbon mixtures. Expressly recited is the separation of aromatics from kerosene U.S. Pat. No. 2,958,656 teaches the separation of hydrocarbons by type, i.e. aromatic, unsaturated, saturated, by permeating a portion of the mixture through a non-porous cellulose ether membrane and removing permeate from the permeate side of the membrane using a sweep gas or liquid. Feeds include hydrocarbon mixtures, naphtha (including virgin naphtha, naphtha from thermal or catalytic cracking, etc.).

U.S. Pat. No. 2,930,754 teaches a method for separating hydrocarbons e.g. aromatic and/or olefins from gasoline boiling range mixtures, by the selective permeation of the aromatic through certain cellulose ester non-porous membranes The permeated hydrocarbons are continuously removed from the permeate zone using a sweep gas or liquid U.S. Pat. No. 4,115,465 teaches the use of polyurethane membranes to selectively separate aromatics from saturates via pervaporation.

DETAILED DESCRIPTION OF THE INVENTION

As previously stated, an aromatic anisotropic polyurea/urethane membrane is described which is useful for the separation of aromatics from non-aromatics as, for example, in upgrading naphtha streams and in chemical operations.

The aromatic polyurea/urethane membrane is an anisotropic membrane characterized by possessing a urea index, defined as the percentage of the total of urea and urethane groups that are urea, of at least about 20% but less than 100%, an aromatic carbon content of at least about 15 mole percent, a functional group density of at least about 10 per 1000 grams of polymer, and a C=O/NH ratio of less than about 8.

The aromatic polyurea/urethane membrane is produced using an aromatic polyurea/urethane copolymer which is itself prepared by reacting dihydroxy or polyhydroxy compounds (e.g., polyethers or polyesters of about 500 to 5000 molecular weight or mixtures of different molecular weight polymers of the same type, e.g. 30:70/70:30 mixtures of a 500 molecular wt. polyester and a 2000 molecular wt. polyester) with aliphatic, alkylaromatic or aromatic diisocyanates or polyisocyanates and low molecular weight chain extenders, such as diamines, polyamines or amino alcohols. The choice of the molecular weight of the polyether or polyester component is a matter of compromise. Polyether or polyester components of about 500 molecular weight give membranes of highest selectivity, but with lower flux. Polyester or polyether of higher molecular weight (e.g. about 2000 and more) give membranes of lower selectivity but increased flux. Thus, the choice of the single molecular weight or blend is a matter of choice and compromise between selectivity and flux. The ratio of these components used in producing the polyurea/urethane copolymer is governed by the aforementioned characteristics possessed by the membranes useful for aromatic from saturate separation. The copolymer produced possesses a urea index of at least about 20% but less than 100%, preferably at least 30% but less than 100%, most preferably at least about 40% but less than 100%. By urea index is meant the percentage of urea groups relative to the total urea plus urethane groups in the polymer. The copolymer also contains at least about 15 mole percent, and preferably at least 20 mole percent aromatic carbon, expressed as a percent of the total carbon in the polymer. The copolymer also possesses a particular density of functional groups (DF ratio) defined as the total of (C=O+NH) per 1000 grams of polymer, the density of functional group being greater than about 10, preferably greater than about 12. Finally, to insure that the functional groups are not mostly carbonyl, the C=O+NH ratio is less than about 8 and preferably less than about 5.0. This insures that there is sufficient hydrogen bonding within the polymer, resulting in strong polymer chain interactions and high selectivity. Symmetric polyurea/urethane which possess these characteristics are the subject of U.S. application Ser. No. 108,822, filed even date herewith in the name of Robert C. Schucker.

The anisotropic polyurea/urethane membranes of the present invention are produced utilizing polyurea/urethane polymers possessing the above recited characteristics. These polyurea/urethane polymers are synthesized in a high boiling solvent such as dimethylformamide (DMF) but which contain less than about 5 vol % non-solvent, preferably about 0 vol % non-solvent to produce a casting solution. A film of such solution is deposited on an appropriate substrate with a maximum pore size less than 20 microns but preferably on a non-porous support such as glass plate, metal surface or release paper. Once the film has been deposited the film is subjected to conditions such that the solvent vapor pressure-time factor is about 1000 mm Hg-min or less, preferably 200 mm Hg-min or less, most preferably approaching 0 mm Hg-min. Following evaporation of a part of the solvent, the membrane is quenched in a quenching bath containing a non-solvent quenching medium which will not dissolve or soften the polymer but in which the solvent used to produce the casting solution is soluble to insure complete solvent exchange and removal. The preferred quenching medium is water.

A thin dense layer of polyurea/urethane exists immediately above the support surface which is the barrier effective for aromatic/saturate separation. A thin non-continuous skin exists at the membrane/quench solvent interface which is not effective for aromatic/saturates separation. An open porous structure exists between the thin dense layer immediately above the support surface and the non-continuous skin at the quench solvent-/membrane interface. Because f the thinness of the dense selective layer the membranes have very high fluxes.

Figure 2:
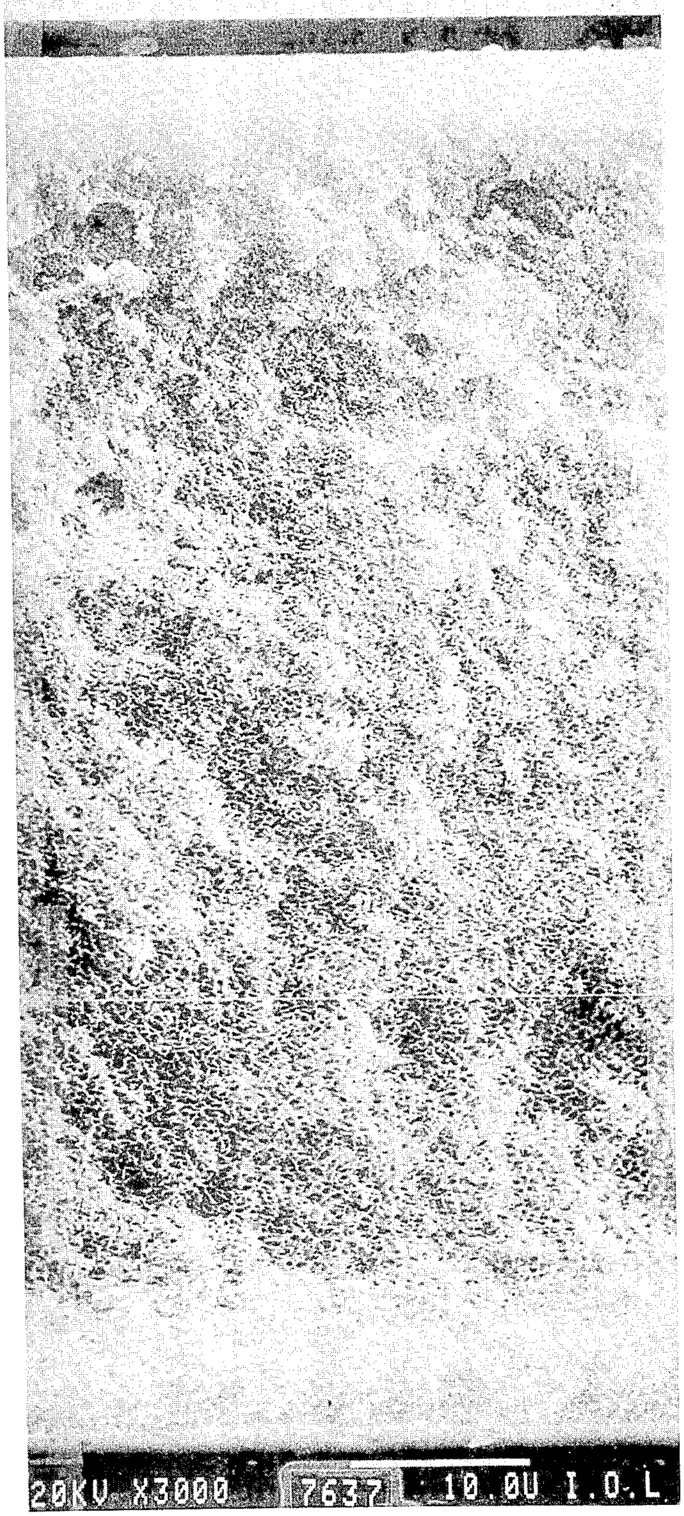
FIG. 2 is an SEM picture of a typical reverse osmosis 2 layer asymmetric membrane

A magnified view using a scanning electron microscope (SEM) can be seen in FIG. 1. The SEM picture clearly demonstrates that the membranes of the present invention are significantly different from the traditional asymmetric RO membranes such as that depicted in FIG. 2. In order to achieve the unique three-layered morphology depicted in FIG. 1, the polyurea-urethane membranes must be cast within a specific operating window. The operating window is characterized as follows:

(1) the polymer solution must contain less than 5% non-solvent, but preferably 0% non-solvent (2) the polymer solvent must be cast on a support with a maximum pore size less than 20 microns, but preferably on a non-porous support and (3) the polymer solvent vapour pressure-time factor must be about 1000 mm Hg-min or less, preferably about 200 mm Hg-min or less, most preferably approaching 0 mm Hg-min.

The membranes of the present invention are especially well suited for separating aromatics from non-aromatics, saturates in heavy feeds, such as heavy cat naphtha, wherein the constituents making up the feed include, in some cases, highly complex, multiring, heavily substituted aromatic species. Other aromatic/non-aromatics-saturates streams in petroleum refineries which can be separated into their various aromatic and non-aromatics-saturate components include, without limitation, intermediate cat naphtha boiling in the 200°-320° F. range, light aromatic/saturate streams boiling in the $C_5$ to 300° F. range, light cat cycle oil boiling in the 400°-650° F. range. Similarly aromatics can be recovered from various other hydrocarbon streams in chemicals application, in particular benzene, toluene and xylenes can be recovered from streams typically encountered in chemical plants, such as cat cracker stocks.

Urethane and polyurethane membranes which do not possess the characteristics recited above are inferior for the separation of aromatics from saturates when compared to the membranes of the present invention. Polyurea/urethane membranes which are not aromatic (i.e. contain less than at least 15 mole percent aromatic carbon expressed as a percent of the total carbon in the polymer) are inferior to the aromatic polyurea/urethane membranes which are the subject of the present invention.

As previously stated, the membranes are produced from a polyurea/urethane copolymer made from dihydroxy or polyhydroxy compounds, such as polyethers or polyesters of about 500 to 5000 molecular weight, reacted with aliphatic, alkylaromatic or aromatic diisocyanates or polyisocyanates and low molecular weight chain extenders, such as diamines, polyamines or amino alcohols.

The polyester components are prepared from aliphatic or aromatic dicarboxylic acids and aliphatic or aromatic dialcohols. Aliphatic dicarboxylic acids refer to those materials having the general formula HOOCRCOOH where R contains 2 to 10 carbons (and may be either a straight or branched chain configuration). Aromatic dicarboxylic acids refer to those materials having the general structure HOOCRCOOH where R is:

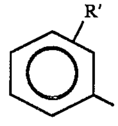

I

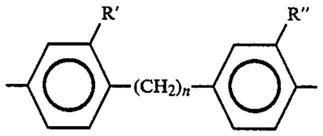

II wherein R' and R" may be the same or different and are selected from the group consisting of H and $C_1$-$C_5$ carbons or $C_6H_5$ and combinations thereof, and n is 0 to 4. It is to be understood that in the above formula each R' or R" may itself represent a mixture of H, $C_1$-$C_5$ or $C_6H_5$.

Dialcohols have the general structure HOROH where R may be $-(CH_2)_n-$ III

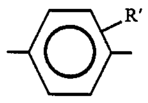

IV where n is 1 to 10, preferably 4 to 6, and R' is H $C_1$ to $C_5$ or $C_6H_5$ or

V

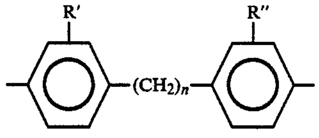

where R', R'' and n are defined in the same manner as for the aromatic dicarboxylic acids.

The diisocyanates are preferably aromatic diisocyanates having the general structure:

VI

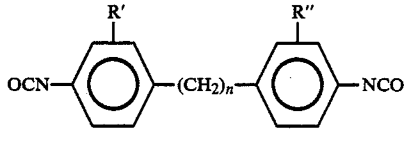

wherein R' and R'' are the same or different and are selected from the group consisting of H, $C_1$–$C_5$ and $C_6H_5$ and n ranges from 0 to 4.

Diamine chain extenders have the general formula $H_2NRNH_2$ where R includes aliphatic and aromatic moieties such as $$—(CH_2)_n— \qquad \text{VII}$$

where n is 1 to 10.

Also included are diamine chain extenders of the formula:

VIII

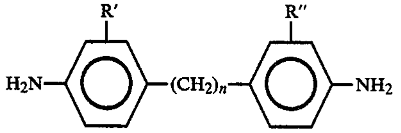

where R' and R' are the same or different and are selected from the group consisting of H or Cl or a $C_1$ to $C_5$ or $C_6H_5$ and n ranges from 0 to 4.

Examples of the polyether polyols useful in the present invention as polymer orecursors are polyethylene glycols, (PEG), polypropylene glycol (PPG), polytetramethylene glycol, PEG/PPG random copolymers, etc. having molecular weight ranging from about 400 to 4000. Aliphatic diisocyanates which may be utilized are exemplified by hexamethylene diisocyanate (HDI), 1,6-diisocyanato-2,2,4,4-tetramethylhexane (TMDI), 1,4-cyclohexanyl diisocyanate (CHDI), isophorone diisocyanate (IPDI), while useful alkylaromatic diisocyanates are exemplified by toluene diisocyanate (TDI) and bitolylene diisocyante (TODI). Aromatic diisocyanates are exemplified by 4,4'-diisocyanato diphenylmethane (MDI). Polyisocyanates are exemplified by polymeric MDI (PMDI) and carbodiimide modified MDI. Useful polyamines are exemplified by polyethyleneimines. Useful amino alcohols are exemplified by 6-aminohexanol, 4-aminophenol, 4-amino 4' hydroxydiphenylmethane.

The above are presented solely by way of example. Those skilled in the art, with the present teaching before them, can select from the innumerable materials available the various starting materials which upon combination as described herein will produce a polyurea/urethane copolymer having the desired characteristics which can then be cast into the membranes useful for the separation of aromatics from saturates.

Figure 3B:
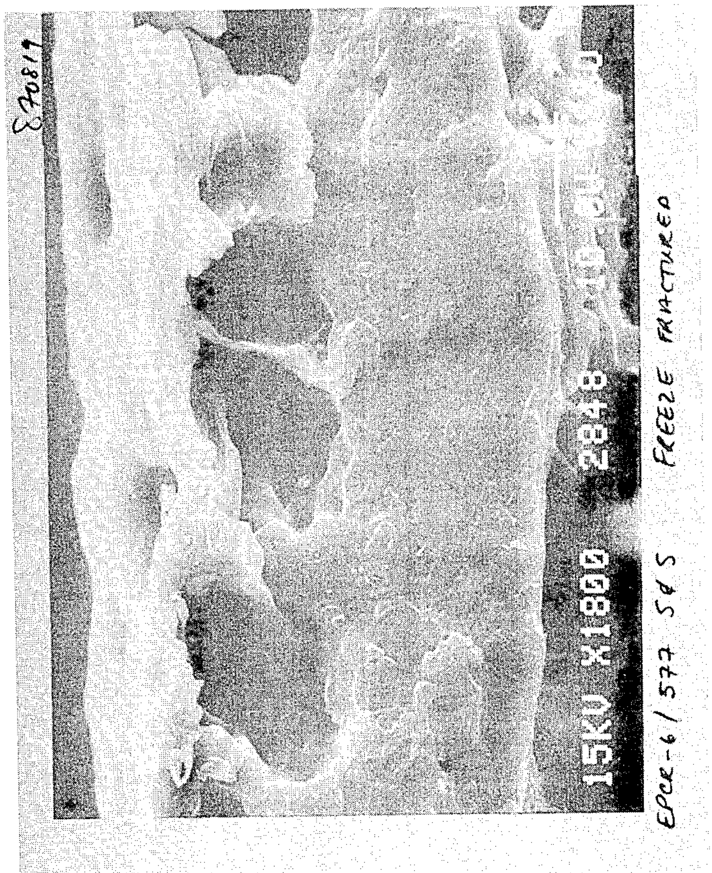
FIGS. 3A and 3B are SEM pictures of 3 layered anisotropic membranes of the present invention on cellulose filter paper support at 2 different magnifications, one at 200× the other at 1800× respectively.
Figure 3A:
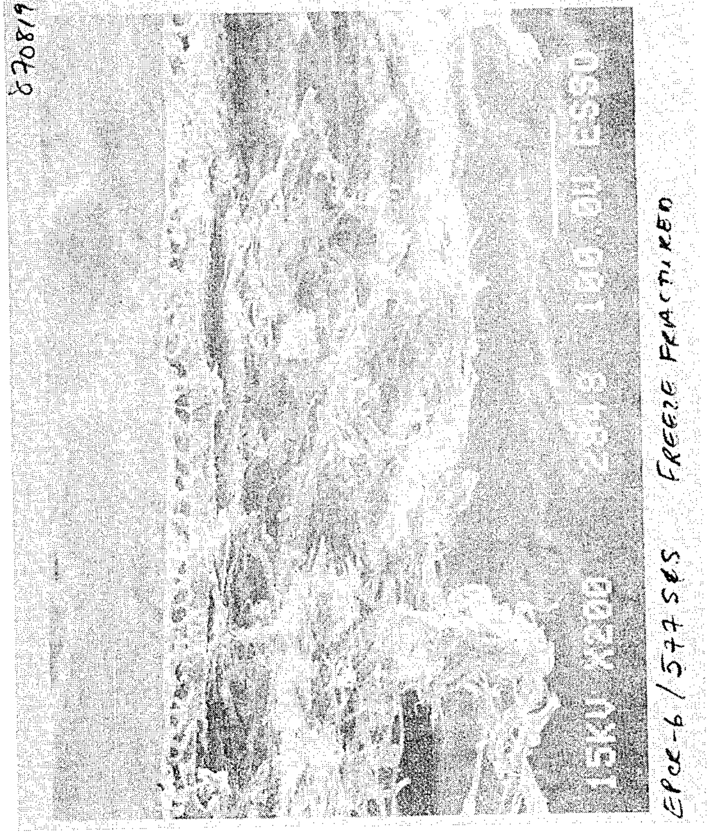

As previously stated, in order to achieve the three-layered morphology which yields membranes with high flux rates but are still effective for aromatic/non-aromatics-saturate separation, the membranes must be cast within a window of specified conditions. Table 1 shows that the addition of only 7% dioxane (non-solvent) produces a porous membrane and significantly reduces the membrane's separation performance. Table 2 shows that using a porous support with pore sizes greater than 20 microns also produces a porous membrane and significantly reduces the separation performance On the other hand, casting within the specified operating window on non-porous supports such as a glass plate or release paper results in substantially higher fluxes while maintaining the separation performance. Furthermore, casting within the specified operating window on a cellulose filter paper support with a maximum pore size less than 20 microns, produces the three-layered anisotropic membrane on top of the support as shown in FIGS. 3A and 3B. Table 2 shows that this membrane still possesses excellent aromatic/saturate separation ability.

The film cast under the above conditions can be of any thickness, but preferably ranges anywhere from 0.3 to 500 microns. After casting, the film is subjected to conditions such that the solvent vapour pressure-time factor is about 1000 mm Hg-min or less, but preferably about 200 mm Hg-min or less. Table 3 shows that three-layered anisotropic membranes with excellent flux and separation performance can be formed by casting within the 1000 mm Hg-min or less, preferably 200 mm Hg-min or less, most preferably approaching 0 mm Hg-min operating window. Heating the film at conditions such that the solvent vapour-time factor is greater than 1000 results in lower flux, symmetric films. Solvent evaporation is not critical to forming the anisotropic membranes, hence vapor pressure-time factors as low as physically possible and preferably 0 mm Hg-min can be used and are preferred.

Due to the thinness of the dense selective polyurea/urethane layer the anisotropic membrane exhibits extremely high flux while maintaining a very high degree of selectivity. The anisotropic membrane may also be used at high temperatures exhibiting even higher fluxes while maintaining selectivity. The anisotropic membranes of the present invention can be employed at temperatures of about 100° to 170° C. without exhibiting selectivity deterioration.

As previously stated, the membranes are useful for the separation of aromatics from non-aromatics and saturates in petroleum and chemical streams, and have been found to be particularly useful for the separation of large substituted aromatics from non-aromatics and saturates as are encountered in heavy cat naphtha streams. The separation is performed by contacting the feed to be separated with either face of the anisotropic membrane. The separation techniques which may successfully employ the membranes of the present invention include pervaporation.

Pervaporation is run at generally elevated temperatures and relies on vacuum on the permeate side to evaporate the permeate from the surface of the membrane and maintain the concentration gradient driving force which drives the separation processes. The asymmetric membranes of the present invention are particularly well suited for use in the pervaporation environment. The aromatic molecules present in the feed dissolve into the membrane film, migrate through said film and reemerge on the permeate side under the influence of a concentration gradient. Pervaporative separation of aromatics from saturates can be performed at a temperature of about 25° C. for the separation of benzene from hexane but for separation of heavier aromatic/saturate mixtures, such as heavy cat naphtha, higher temperature of at least 80° C. and higher, preferably at least 100° C. and higher, more preferably 120° C. and higher should be used. Temperatures of about 140° C. have been successfully employed with polyurea/urethane membranes of the present invention, the maximum upper limit being that temperature at which the membrane is physically damaged. Vacuum on the order of 0.1 mm Hg to atmospheric pressure can be pulled on the permeate side. The higher the temperature employed the poorer the vacuum required. The vacuum stream containing the permeate is cooled to condense out the highly aromatic permeate. Condensation temperature should be below the dew point of the permeate at a given vacuum level.

The membrane itself may be in any convenient form utilizing any convenient module design. Thus, sheets of membrane material may be used in spiral wound or plate and frame permeation cell modules. Tubes and hollow fibers of membranes may be used in bundled configurations with either the feed, (or vacuum) in the internal space of the tube or fiber, the other material obviously being on the other side. Hollow fibers of the present anisotropic membrane can be made by using hollow fibers of, for example regenerated cellulose as the support medium, coating the outside of such support fibers with the casting solution and immediately quenching the membrane.

The present invention will be better understood by reference to the following Examples which are offered by way of illustration and not limitation.

EXAMPLE 1

A solution containing a polyurea-urethane polymer is prepared as follows. Fourteen point seven (14.7) grams (0.0076 moles) of polyethylene adipate (MW =2000) and 3.81 grams (0.0152 moles) of 4,4′-diphenylmethane diisocyanate are added to a 250 ml flask equipped with a stirrer and drying tube. The temperature is raised to 90° C. and held for 2 hours with stirring to produce an isocyanate-end-capped prepolymer. Twenty grams of dimethyl-formamide is added to this prepolymer and the mixture is stirred until clear. One point five grams (0.0076 moles) of 4,4′-diaminodiphenylmethane is dissolved in ten grams of dimethylformamide and then added as a chain extender to the prepolymer solution. This mixture (30 wt % polymer in DMF) was then allowed to react at room temperature (approx. 22° C.) for 20 minutes. Films were cast on a glass plate using a 5 mil casting knife and then placed in a convection oven at 100° C. for 1 hour (conditions such that the solvent vapor pressure-time relationship was about 6000 mm Hg-min).

EXAMPLE 2

A prepolymer was prepared as in Example 1 except that 1000 MW polyethylene adipate was used. Chain extension was carried out as in Example 1.

EXAMPLE 3

A prepolymer was prepared as in Example 1 except that 7.55 grams (0.0039 moles) of 2000 MW polyethylene adipate was blended with 1.97 grams (0.0039 moles) of 500 MW polyethylene adipate and endcapped with 3.92 grams (0.015 moles of 4,4′-diphenylmethane diisocyanate. Chain extension was carried out as in Example 1, using 1.55 grams (0.0078 moles) of 4,4′diamino-diphenylmethane. Films were cast on a glass plate using a 5 mil knife and then placed in a convection oven at 100° C. for 1 hour (conditions such that the solvent vapor pressure-time relationship was about 6000 mm Hg-min.).

EXAMPLE 4

The polymer solution was prepared as in Example 3. After casting on a glass plate with a 5 mil knife, the films were placed in a convection oven for 15 minutes at 90° C. After 15 minutes the membrane was quenched in a deionized-water bath held at room temperature. Conditions were such that the solvent vapor pressure-time relationship was on the order of 1500 mm Hg-min.

EXAMPLE 5

The polymer solution was prepared as in Example 3. After casting on a glass plate with a 5 mil knife, the films were placed in a convection oven for 5 minutes at 90° C. After 5 minutes the membrane was quenched in a deionized-water bath held at room temperature. Solvent evaporation conditions were such that the solvent vapor pressure-time relationship, was about 500 mm Hg-min.

EXAMPLE 6

The polymer solution was prepared as in Example 3. After casting on a glass plate with a 5 mil knife the films were placed in a convection oven for 2 minutes at 90° C.. After 2 minutes the membrane was quenched in a water bath held at room temperature. Solvent evaporation conditions were such that the solvent vapor pressure-time relationship was about 200 mm Hg-min.

EXAMPLE 7

The prepolymer was prepared as in Example 1 except that 4.68 grams (0.02234 moles) of 2000 MW polyethylene adipate was blended with 2.73 grams (0.0546 moles) of 500 MW polyethylene adipate and endcapped with 3.92 grams (0.0156 moles) of 4,4′-diphenylmethane diisocyanate. Chain extension was carried out as in Example 1, using 1.55 grams (0.0078 moles) of 4,4′-diamino-diphenylmethane. Films were cast on Weboral 141015 polyester non-woven cloth with a 5 mil knife and then placed in a convection oven at 90° C. for 5 minutes. After 5 minutes the membrane was quenched in a water bath held at room temperature. Solvent evaporation conditions were such that the solvent vapor pressure-time relationship was about 500 mm Hg-min.

EXAMPLE 8

The membrane was prepared as in Example 7 but was placed in a convection oven at 140° C. for 2 minutes. Solvent evaporation conditions were such that the solvent vapor pressure-time relationship was about 1000 mm Hg-min.

EXAMPLE 9

The membrane was prepared as in Example 7 but cast on Warren Transkote EHR II release paper and heated in a convection oven at 90° C. for 2 minutes. Solvent evaporation conditions were such that the solvent vapor pressure-time relationship was about 200 mm Hg-min.

EXAMPLE 10

The membrane was prepared as in Example 7 but cast on Warren Transkote VIR release paper and heated in a convection oven at 90° C. for 2 minutes. Solvent evaporation conditions were such that the solvent vapor pressure-time relationship was about 200 mm Hg-min.

EXAMPLE 11

The membrane was prepared as in Example 7 but cast on Schleicher and Schuel 577 cellulose filter paper and heated in a convection oven at 130° C. for 2 minutes. Solvent evaporation conditions were such that the solvent vapor pressure-time relationship was about 800 mm Hg-min.

EXAMPLE 12

The membrane was prepared as in Example 3 except that the final polymer solution contained 7 wt % dioxane. The film was quenched in room temperature water immediately after casting with a 5 mil knife on a glass plate. Solvent evaporation conditions were such that the solvent vapor pressure-time relationship was about 0 mm Hg-min.

EXAMPLE 13

The membrane was prepared as in Example 12 except that the polymer solution was held at room temperature for 1 minute before quenching in water. Solvent evaporation conditions were such that the solvent vapor pressure-time relationship was about 3 mm Hg-min.

EXAMPLE 14

The membrane was prepared as in Example 12 without the addition of dioxane. Solvent evaporation conditions were such that the solvent vapor pressure-time relationship was about 0 mm Hg-min.

EXAMPLE 15

The membrane was prepared as in Example 13 without the addition of dioxane. Solvent evaporation conditions were such that the solvent vapor pressure-time relationship was about 3 mm Hg-min.

All membranes were treated in a 3.5 cm diameter (9.6 $cm^2$) cell operated in a pervaporation mode. The feed was recycled and the duration of the tests were such that the feed concentrations did not change appreciably. The permeate side of the cell was held under vacuum (1–30 mbar; typical 5 mbar) with the permeate removed in the gaseous form and then condensed to a liquid for further analysis. The aromatics, aliphatics and olefins were measured using the standard ASTM FIA analysis (ASTM D1319).

Run Nos. 1-1 to 1-4 (summarized in Table 4) demonstrate that the maximum operating temperature for polyurea-urethanes with a polyester (polyethylene adipate) average MW of 2000 is approximately 100° C. Specifically, Run No. 1-4 shows that the membrane swelled to the point where the aliphatic hydrocarbons freely diffused through the membrane. Run Nos. 2-1 to 2-3 demonstrate that reducing the polyester MW to 1000 improves the temperature stability. The best results were obtained by incorporating 500 MW polyester (1-1 to 1-3). Run Nos. 4-1 to 4-2 and Run Nos. 5-1 to 5-3 clearly demonstrate that permeation rates at a given temperature are much higher for the anisotrepic membrane without any loss in selectivity. The characteristics of the membrane shown in the examples are summarized in Table 5.

TABLE 1

EFFECT OF DIOXANE ON MEMBRANE PERFORMANCE
(Heavy Cat Naphtha Feed: 51 vol % arom)
(pervaporation @ 140° C., 5 mbar, glass plate support)

| Membrane | Non Solvent Conc wt % | Vapour Pressure-Time mmHg-min | Flux $kg/m^2$-d | Permeate Aromatics vol % | Type of Film* |
|---|---|---|---|---|---|
| Example 12 | 7 | ~0 | 467.5 | 69.5 | P |
| Example 13 | 7 | 3 | 446.7 | 66.1 | P |
| Example 14 | 0 | ~0 | 120.0 | 86.2 | A |
| Example 15 | 0 | 3 | 115.0 | 86.6 | A |

*based on SEM; A = 3-layered anisotropic, P = porous

TABLE 2

EFFECT OF SUPPORT ON MEMBRANE PERFORMANCE
(Heavy Cat Naphtha Feed: 51 vol % arom,
pervaporation @ 140° C. and 5 mbar)

| Membrane | Support | Max Pore Size microns | Vapour Pressure-Time mmHg-min | Flux $kg/m^2$-d | Permeate Aromatics vol % | Type of Film* |
|---|---|---|---|---|---|---|
| Example 7 | Weboral 141015 polyester non-woven cloth | 40 | 500 | 168 | 64.0 | P |
| Example 8 | Weboral 141015 polyester non-woven cloth | 40 | 1000 | 40 | 69.0 | P |
| Example 6 | glass plate | 0 | 200 | 126 | 85.2 | A |
| Example 9 | Warren Transkote EHR II release paper | 0 | 200 | 100 | 85.3 | A |
| Example 10 | Warren Transkote VIR CIS release paper | 0 | 200 | 93 | 85.3 | A |
| Example 11 | Schleicher & Schuell 577 cellulose filter paper | 1 | 800 | 55 | 87.6 | A on cellulose support |

*based on SEM; P = porous, A = 3-layered anisotropic

TABLE 3

EFFECT OF VAPOUR PRESSURE-TIME ON MEMBRANE PERFORMANCE (Heavy Cat Naphtha feed: 51 vol % arom, Pervaporation @ 140° C. and 5 mbar, glass plate support)

| Membrane | Evaporation Temperature °C. | Vapour Pressure-Time mmHg-min | Flux kg/m²-d | Permeate Aromatics vol % | Type of Film* |
|---|---|---|---|---|---|
| Example 14 | 22 | ~0 | 120.0 | 86.2 | A |
| Example 15 | 22 | 3 | 115.0 | 86.6 | A |
| Example 6 | 90 | 200 | 126 | 85.2 | A |
| Example 5 | 90 | 500 | 70 | 84.0 | A |
| Example 3 | 90 | 6000 | 55 | 88.0 | D,S |

*based on SEM; D = dense, S = symmetric, A = 3-layered anisotropic

TABLE 4

(Heavy Cat Naphtha feed, pervaporation)

| Run No. | Membrane | Type of Film* | Temp. (°C.) | Pressure (mbar) | Flux (kg/m²-d) | Permeate, FIA Vol % Arom | Sat | Olef | α |
|---|---|---|---|---|---|---|---|---|---|
| | | | | | | FEED 51.0 | 28.0 | 21.0 | |
| 1-1 | Example 1 | D,S | 80 | 1.0 | 31.6 | 87.4 | 6.1 | 6.5 | 7.9 |
| 1-2 | " | D,S | 100 | 1.0 | 56.0 | 85.4 | 5.9 | 8.7 | 7.9 |
| 1-3 | " | D,S | 100 | 10.0 | 33.0 | 82.0 | 8.2 | 9.8 | 5.5 |
| 1-4 | " | D,S | 120 | 10.0 | 310.4 | 56.3 | 24.0 | 19.8 | 1.3 |
| 2-1 | Example 2 | D,S | 100 | 10.0 | 10.4 | 84.4 | 7.8 | 7.8 | 5.9 |
| 2-2 | " | D,S | 120 | 10.0 | 17.4 | 73.5 | 14.1 | 12.4 | 2.9 |
| 2-3 | " | D,S | 130 | 10.0 | 90.1 | 65.8 | 19.5 | 14.7 | 1.9 |
| 3-1 | Example 3 | D,S | 120 | 5.0 | 17.2 | 83.7 | 7.7 | 8.6 | 6.0 |
| 3-2 | " | D,S | 130 | 5.0 | 41.7 | 88.0 | 5.9 | 6.1 | 8.2 |
| 3-3 | " | D,S | 140 | 5.0 | 55.2 | 85.6 | 7.3 | 7.1 | 6.4 |
| 4-1 | Example 4 | A | 120 | 5.0 | 47.8 | 88.0 | 6.3 | 5.8 | 7.7 |
| 4-2 | " | A | 140 | 5.0 | 88.8 | 85.1 | 8.0 | 6.9 | 5.8 |
| 5-1 | Example 6 | A | 100 | 5.4 | 36.0 | 87.9 | 6.8 | 5.3 | 7.1 |
| 5-2 | " | A | 120 | 5.0 | 74.3 | 84.9 | 8.0 | 7.0 | 5.8 |
| 5-3 | " | A | 140 | 5.2 | 126.3 | 85.2 | 7.7 | 7.2 | 6.1 |

$$\alpha = \frac{(\text{Concentration aromatics/concentration saturate-olefins})_{permeate}}{(\text{Concentration aromatics/concentration saturate-olefins})_{feed}}$$

*based on SEM; D = *dense, S = symmetric, A = 3-layered anisotropic*

TABLE 5

MEMBRANE CHARACTERISTICS*

| Example | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Urea Index | 50.0 | 50.0 | 50.0 | 50.0 | 50.0 | 50.0 | 50.0 | 50.0 | 50.0 | 50.0 | 50.0 | 50.0 | 50.0 | 50.0 | 50.0 |
| C═O/NH | 4.54 | 2.60 | 3.2 | 3.09 | 3.09 | 3.09 | 2.47 | 2.47 | 2.47 | 2.47 | 2.47 | 3.09 | 3.09 | 3.09 | 3.09 |
| Σ(C═O + NH)/1000 g | 12.6 | 12.9 | 12.9 | 12.8 | 12.8 | 12.8 | 12.6 | 12.6 | 12.6 | 12.6 | 12.6 | 12.8 | 12.8 | 12.8 | 12.8 |
| Aromatic Carbon | 25.7 | 39.3 | 34.1 | 35.0 | 35.0 | 35.0 | 41.8 | 41.8 | 41.8 | 41.8 | 41.8 | 35.0 | 35.0 | 35.0 | 35.0 |

*Since the characteristics are related to the molecular weight of the polyester and since the molecular weight changes from batch to batch and is an average molecular weight, variations in the characteristic are to be expected from measurement to measurement and even between batches of the same material.

What is claimed is:

1. An anisotropic membrane: comprising layers of aromatic polyurea/urethane, including a thin dense layer, a thin non-continuous skin and an open porous structure between the aforesaid thin dense layer and the thin non-continuous skin.

2. The anisotropic aromatic polyurea/urethane membrane of claim 1 further characterized in that it possesses a urea index of at least about 20% but less than 100%, an aromatic carbon content of at least about 15 mole %, a functional group density Σ(C═O+NH) per 1000 grams of polymer greater than about 10 and a C═O+NH ratio of less than about 8.

3. The anisotropic aromatic polyurea/urethane membrane of claim 2 wherein the urea index at least about 40% but less than 100% aromatic carbon content is at least about 20 mole %, the functiona group density is greater than about 12 and the C═O+NH ratio is less than about 5.

4. A method comprising separating aromatics from a mixture of aromatics with non-aromatics-saturates by contacting the mixture with one side of an anisotropic aromatic polyurea/urethane membrane characterized by possessing three layers.

5. The method of claim 4 wherein the anisotropic aromatic polyurea/urethane membrane is characterized by possessing a urea index of at least about 20% but less than 100%, an aromatic carbon content of at least about 15 mole %, a functional group density Σ(C═O+NH) per 1000 grams polymer greater than about 10 and a C═O/NH ratio of less than about 8.

6. The method of claim 5 wherein the anisotropic aromatic polyurea/urethane membrane has a urea index of at least about 40% but less than 100%, an aromatic carbon content of at least about 20, a functional group density of greater than about 12 and a C═O/NH ratio of less than about 5.

7. The method of claim 4, 5 or 6 wherein the anisotropic polyurea/urethane membrane is made by preparing a polyurea/urethane copolymer in a good solvent which contains less than about 5 volume percent nonsolvent to produce a casting solution, depositing a film of said casting solution on a support substrate having a maximum pore size of less than 20 microns, subjecting the film to conditions such that the solvent vapor pressure-time factor is about 1000 mm Hg-min or less, and quenching said film on a nonsolvent quenching medium.

8. The method of claim 7 wherein the high boiling solvent is dimethylformamide and contains about 0 volume percent non-solvent, the support substrate is non-porous glass, metal or release paper, the solvent vapor pressure-time factor is about 200 mm Hg-min. or less and the quenching medium is water.

9. The method of claim 6 wherein the separation of aromatics from non-aromatics and saturates using the anisotropic polyurea/urethane membrane is conducted under pervaporation conditions.

10. The method of claim 7 wherein the separation of aromatics from non-aromatics and saturates using the anisotropic polyurea/urethane membrane is conducted under pervaporation conditions.

11. The method of claim 4 wherein the separation of aromatics from non-aromatics and saturates using the anisotropic polyurea/urethane membrane is conducted under pervaporation conditions.

* * * * *